March 22, 1966 E. GLOATES ETAL 3,242,465
DATA PROCESSING SYSTEM
Filed Dec. 4, 1961 8 Sheets-Sheet 1
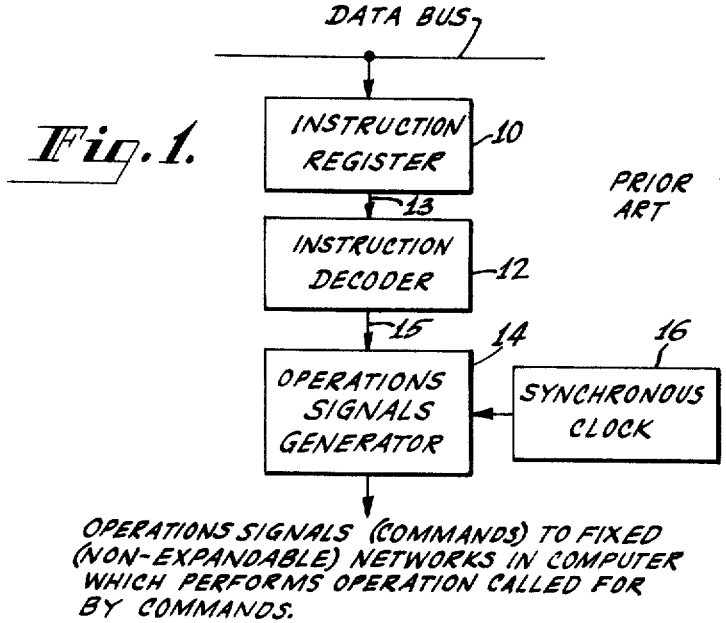
*Fig. 1.* PRIOR ART
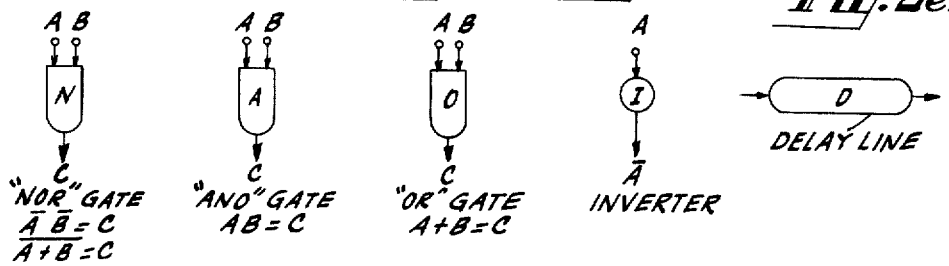
*Fig. 2a.* "NOR" GATE $\overline{A}\,\overline{B}=C$ ; $\overline{A+B}=C$
*Fig. 2b.* "AND" GATE $AB=C$
*Fig. 2c.* "OR" GATE $A+B=C$
*Fig. 2d.* INVERTER
*Fig. 2e.* DELAY LINE
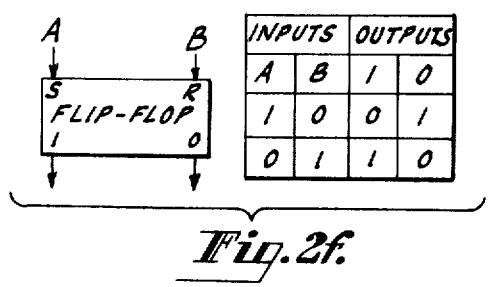
*Fig. 2f.*
INVENTORS
ELI GLOATES &
BY LASZLO L. RAKOCZI
ATTORNEY

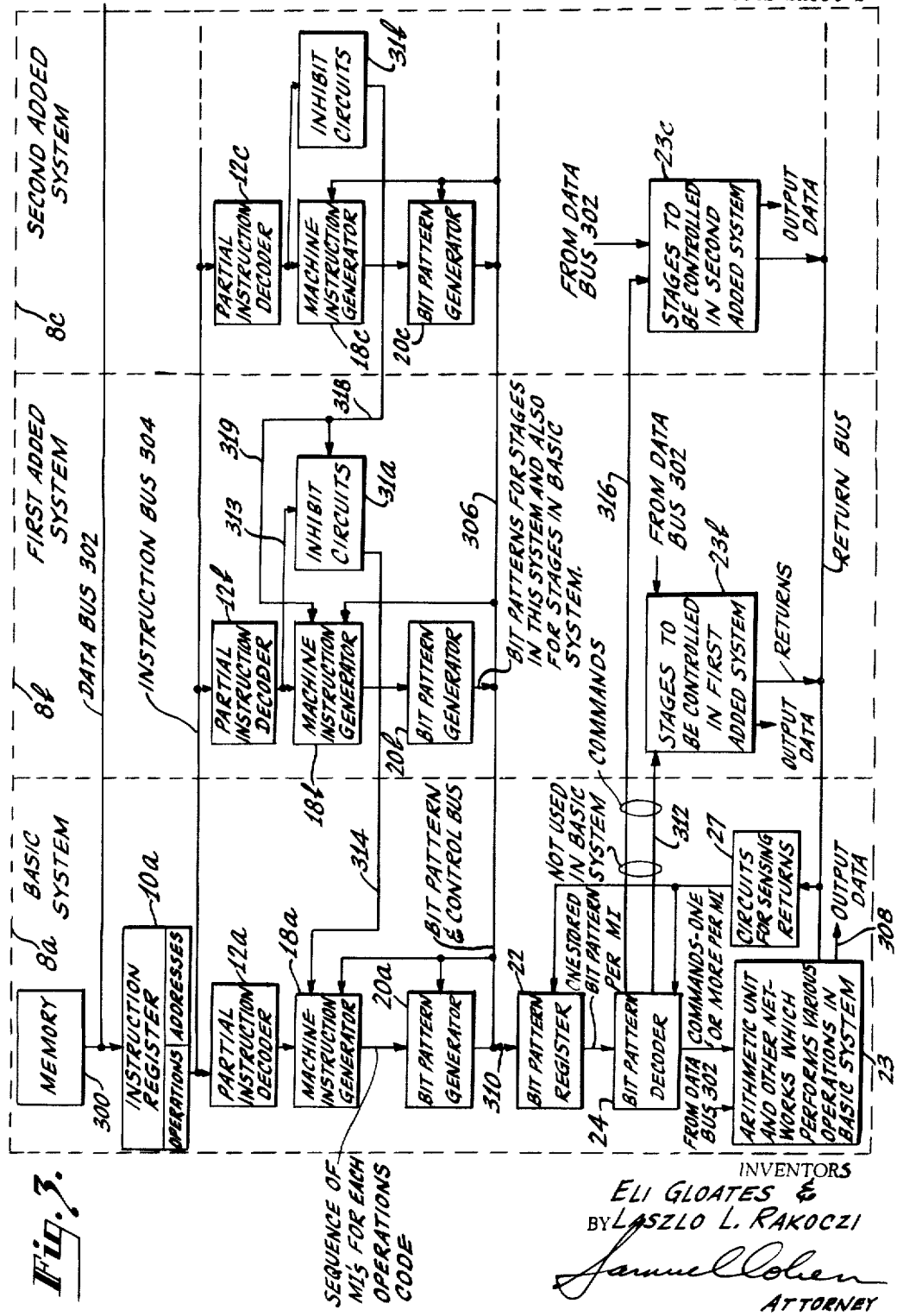

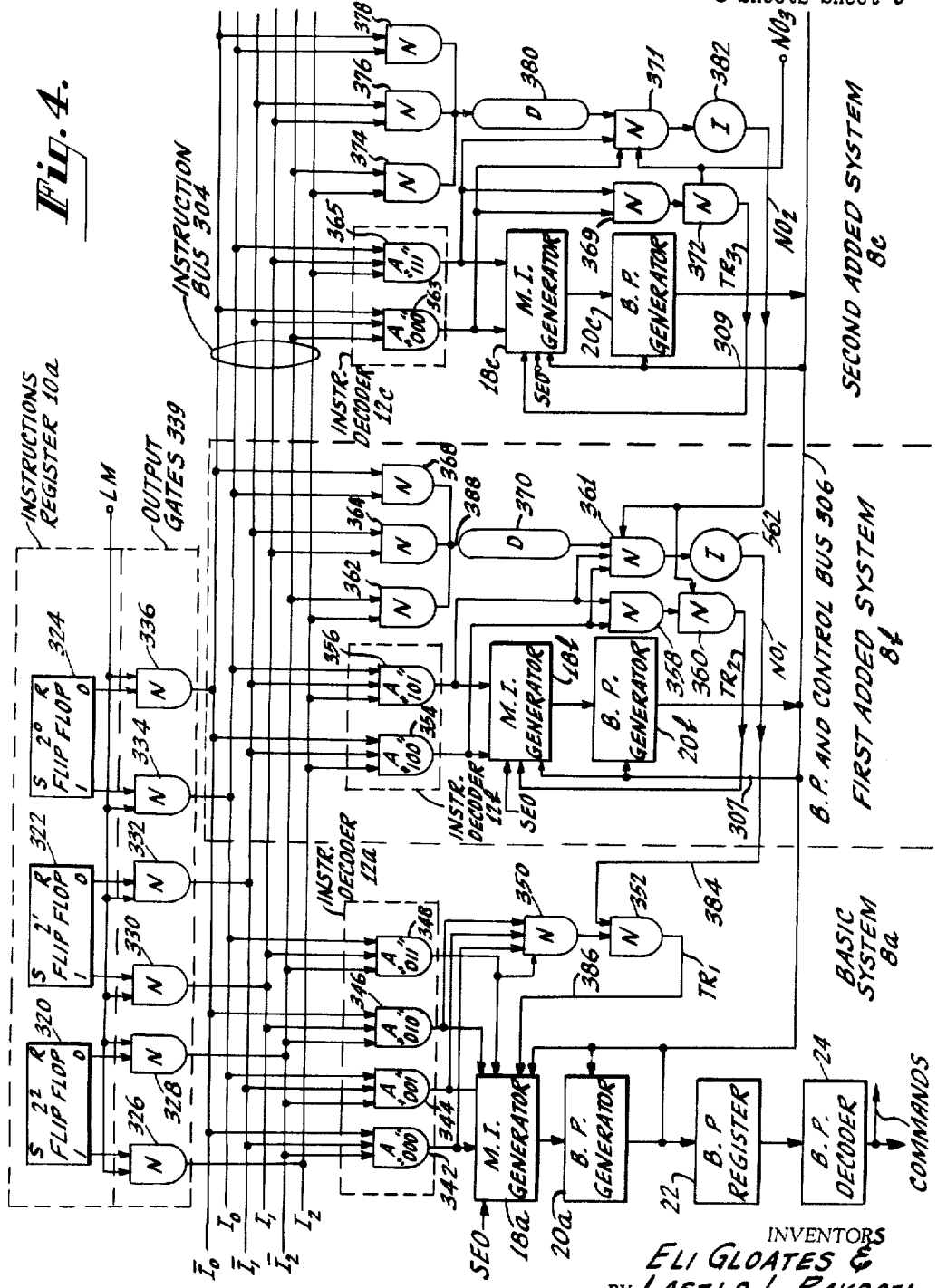

INVENTORS
ELI GLOATES &
LASZLO L. RAKOCZI
ATTORNEY

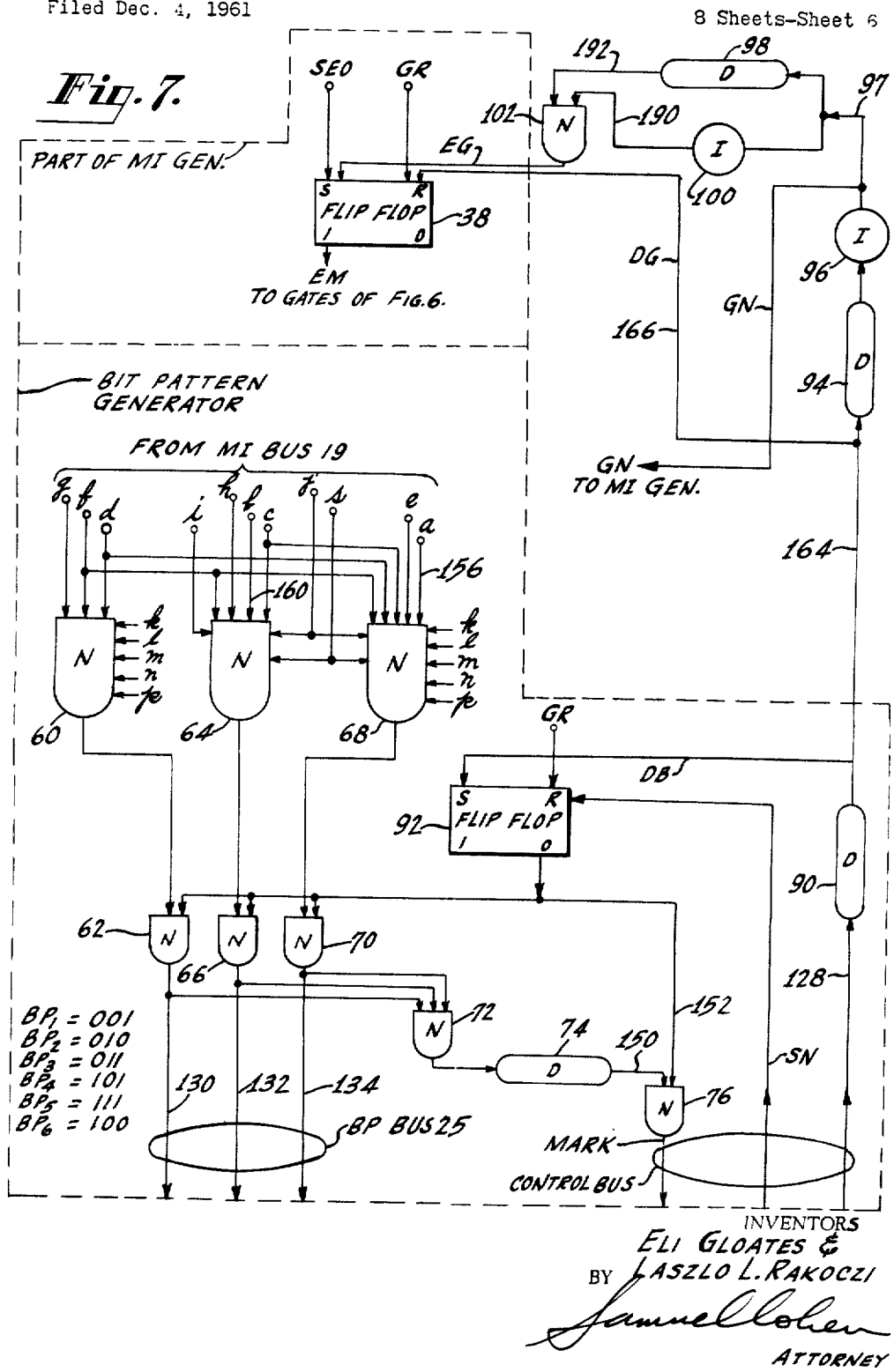

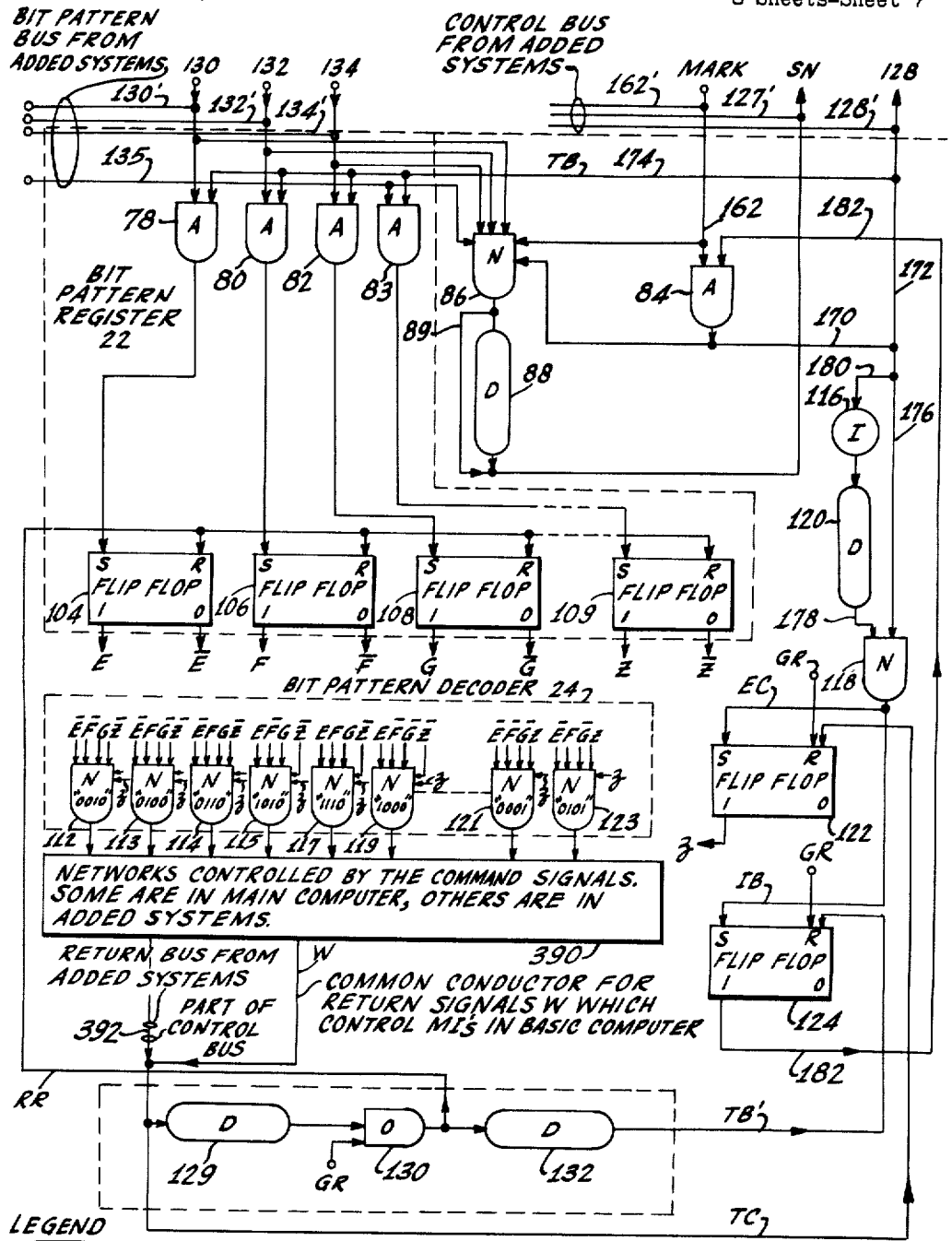

Fig. 10.

S = set
R = reset

| Operation code stored in instruction register | Corresponding sequence of MI signals | Flip Flops | | | | NOR gate enabled | Bit pattern on BP bus | At end of MI sequence | | |
|---|---|---|---|---|---|---|---|---|---|---|
| | | 39 | 40 | 42 | 52 53 54 | | | 39 | 40 | 42 |
| 000 | $MI_1$ | R | R | R | $\bar{A}\bar{B}\bar{C}$ | 401 | $BP_1=001$ | | | |
| | $MI_2$ | R | R | R | $\bar{A}\bar{B}C$ | 402 | $BP_2=010$ | | | |
| | $MI_3$ | R | S | S | $\bar{A}B\bar{C}$ | 403 | $BP_3=011$ | | | |
| | $MI_4$ | R | S | R | $\bar{A}BC$ | 404 | $BP_4=101$ | R | | |
| 001 | $MI_1$ | R | R | R | $\bar{A}\bar{B}\bar{C}$ | 405 | $BP_1=001$ | | R | |
| | $MI_5$ | R | R | S | $\bar{A}\bar{B}C$ | 406 | $BP_5=111$ | | | |
| | $MI_6$ | R | S | S | $\bar{A}B\bar{C}$ | 407 | $BP_6=100$ | R | R | |
| | $MI_7$ | R | S | R | $\bar{A}BC$ | 408 | $BP_2=010$ | | | |
| 010 | $MI_2$ | R | R | R | $\bar{A}B\bar{C}$ | 407 | $BP_2=010$ | | R | R |
| | $MI_3$ | R | R | S | $\bar{A}BC$ | 408 | $BP_2=011$ | | | |
| | $MI_4$ | R | S | S | $\bar{A}\bar{B}C$ | 411 | $BP_4=101$ | R | R | R |
| 011 | $MI_4$ | S | S | S | $AB\bar{C}$ | 412 | $BP_4=101$ | | | |
| | $MI_4$ | S | S | S | $AB\bar{C}$ | 413 | $BP_4=101$ | | | |
| | $MI_4$ | S | S | S | $AB\bar{C}$ | 414 | $BP_4=101$ | | | |
| | $MI_4$ | R | R | R | $\bar{A}BC$ | 415 | $BP_4=101$ | | | |
| | $MI_3$ | R | R | R | $\bar{A}BC$ | 416 | $BP_3=011$ | R | R | R |

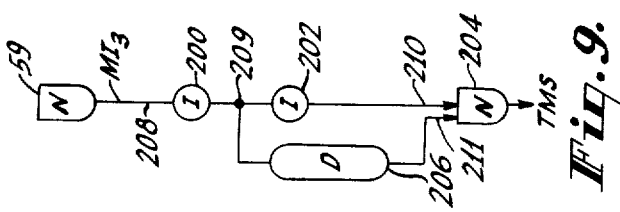

Fig. 9.

INVENTORS
ELI GLOATES &
BY LASZLO L. RAKOCZI

ATTORNEY

United States Patent Office 3,242,465
Patented Mar. 22, 1966

3,242,465
DATA PROCESSING SYSTEM
Eli Gloates, Haddonfield, N.J., and Laszlo L. Rakoczi, Phoenix, Ariz., assignors to Radio Corporation of America, a corporation of Delaware
Filed Dec. 4, 1961, Ser. No. 156,739
13 Claims. (Cl. 340—172.5)

The present invention relates to the control of a data processing system such as a digital computer. More particularly, the invention relates to the problem of efficiently expanding the basic data processing system so that it is capable of performing new operations and/or the same operations more efficiently, as, for example, at higher speed.

Discussion of problem dealt with in the present application

In presently available data processing systems, the number of operations the system can perform is usually fixed. Also, the meaning of each operations word (a code which defines the way in which operations are performed) is fixed. Therefore, the operation called for by an operations word can be executed in only one way.

Whether or not the user requires the full complement of operations a data processing system can perform, he must take the system, as built. On the other hand, if the user later requires more operations than built into the original system, he normally finds it necessary to replace the system with a new and larger system. Expansion of the original data processing system by rebuilding the control system thereof is found not to be practical either from a technical or expense point of view.

It is sometimes possible to add units to an existing computer by employing a coupling unit, sometimes known as a "marriage unit" between the existing computer and networks designed to perform another operation located in an added unit. However, this is found not to be entirely satisfactory. The design of the networks which perform the added operation is controlled by a set of instructions never intended to control the added operation. Accordingly, the design of the added network cannot be an optimum design. Further, in order to connect the added unit to the existing computer, it is, in egneral, necessary to do some rewiring of the existing computer. Finally, marriage units are, in general, very costly.

Brief description of invention

In the system of the invention, a basic data processing system includes an instruction register for storing operations words which are used in the programs in the basic system. These words include those controlling operations such as move, shift, add, and so on. In addition, there are a number of operations words available in the basic system which are not defined in the basic system. These can be defined later according to the user's specialized needs for solving particular problems of interest to him. Any one or more of these words may be employed later when it is desired to expand the computer by adding additional units to the basic computer.

The basic system includes an instruction decoder, and a system responsive to each decoded instruction for generating a sequence of individual or groups of operations signals (known here as commands). The commands are signals which are applied to the networks in the basic system which perform the operations directed by the code (the operation word) stored in the instruction decoder. The system may be expanded by connecting to it one or more supplemental data processing systems, each with its own instruction decoder. Each supplemental system ordinarily also includes one or more circuits for performing computer operations. These may be operations which the basic system is not capable of performing in an economical way such as square-root or high-speed division, as typical examples, or operations which the basic system can perform but only at a relatively low speed, such as addition. When an operations word is received and decoded by an instruction decoder in a supplemental system, that decoder assumes control of the generation of commands in the basic system. The generated commands are applied from the basic system either to circuits in the supplemental system or to circuits in the basic system, as required, to control the operations called for by the commands.

In cases in which an operation perfomed in a supplemental system is the same as an operation formerly performed in the basic system, the programming of the overall system need not be affected. The original program for the operation, for example, addition, is recognized by the supplemental system. It takes over and performs the operation as, for example, addition at higher speed. In cases in which it is desired that a supplemental system perform some new operation which the basic system is incapable of performing, the operation word directed at the instruction decoder in the supplemental system is one of the spare operations words of the basic system. This word is recognized by the instruction decoder in this supplemental system and it assumes control of the operation as already discussed.

The system of the invention includes circuits responsive to the decoding of an operations word by an instruction decoder in a supplemental system for inactivating the instruction decoder in the basic system. In this way, an operations word decoded by a decoder in the supplemental system can control an operation in the supplemental system which would be performed by the basic system in the absence of the supplemental system. The system also includes means for inactivating the instruction decoders when a bit in the operations word is missing.

Summarizing, the system of the prsent invention may be described as an "open-ended" basic data processing system to which supplemental systems may be added at low cost, either without modifying the basic system, or with minor modification of the basic system. It is possible in the supplemental system to override operations performed by the basic system. It is also possible in the supplemental system to perform operations which cannot be performed by the basic system. It is also possible with the aid of circuits in a supplemental system or with the aid of the spare operations words in the basic system to operate circuits in the basic system in a different way than originally intended.

Brief description of drawings

FIG. 1 is a block circuit diagram of prior art control circuits of a digital data processing system;

FIGS. 2a through 2f are diagrams to explain the symbols employed in the remaining figures;

FIG. 3 is a block circuit diagram of the present invention;

FIG. 4 is a more detailed diagram of certain of the circuits shown in FIG. 3;

FIGS. 7 and 8 are more detailed block circuit diagrams of the bit pattern generator, bit pattern register and other circuits shown in FIG. 5;

FIG. 9 is a block circuit diagram of a circuit for resetting the machine instruction generator shown in FIG. 6; and FIG. 10 is a chart showing the sequences of machine instructions produced by the circuit of FIG. 6 and the states of various flip-flops in the same circuit.

Similar reference numerals identify similar elements in the various figures.

General

Figure 5:
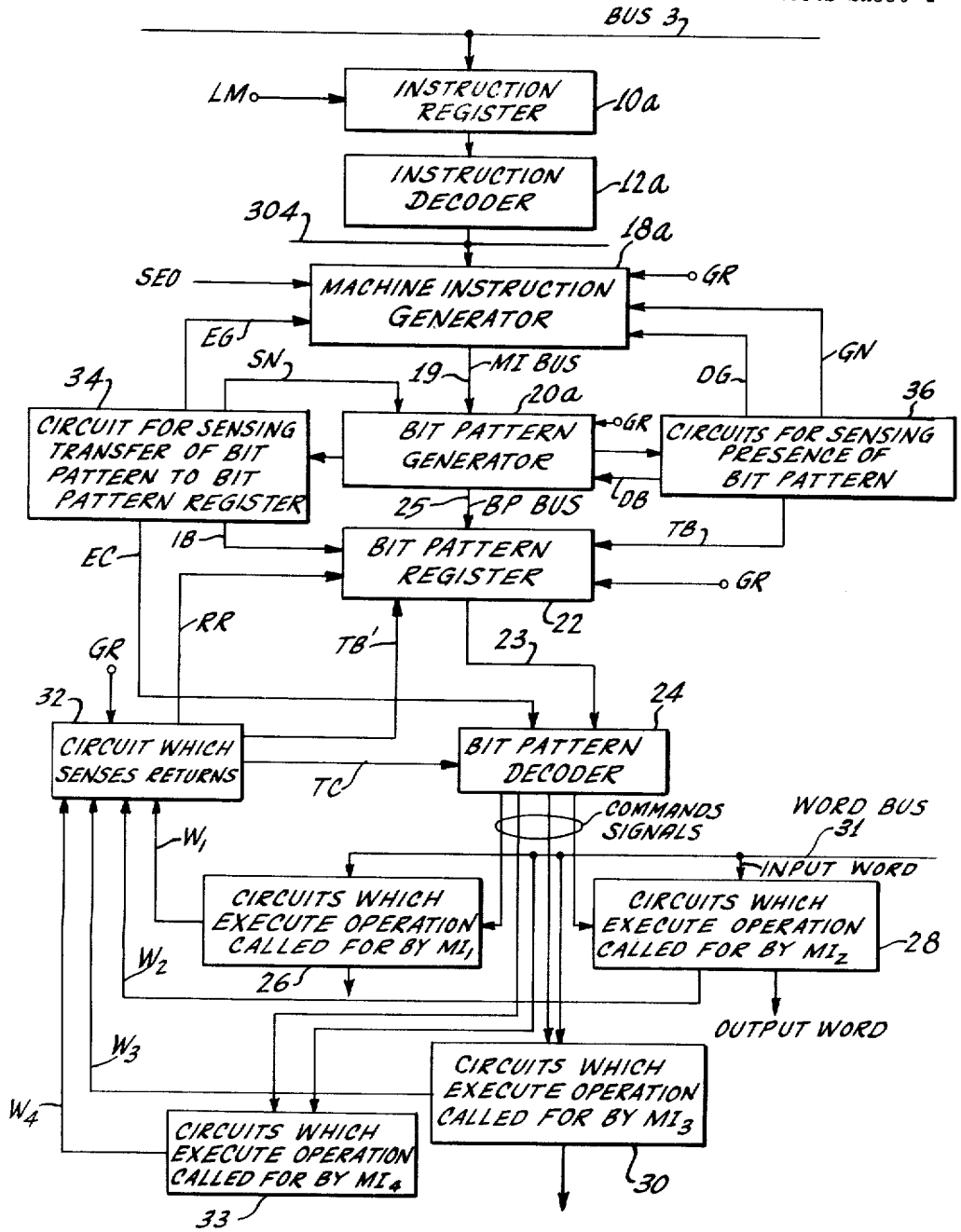
FIG. 5 is a block circuit diagram of the circuits in the basic computer which generate commands. This diagram is somewhat more detailed than the one of FIG. 4 in that it shows certain feedback circuits.

A number of blocks shown in the figures represent known circuits. The circuits of the blocks are actuated by electrical signals applied to the blocks. When a signal is at one level, it represents the binary digit "one" and when it is at another level, such as zero volts, it represents the binary digit "zero." For the sake of the discussion which follows, it may be assumed that a high level signal represents the binary digit "one" and a low level signal the binary digit "zero." Also, to simplify the discussion, rather than speaking of an electrical signal being applied to a block or logic stage, it is sometimes stated that a "one" or a "zero" is applied to a block or logic stage.

Throughout the figures small and capital letters are used to represent signals indicative of binary digits. For example, A may represent the binary digit "zero" or the binary digit "one." $\bar{A}$ represents the complement of A. In some cases, letters are employed in Boolean equations as a convenient means for describing the circuit operation. In some cases, more than one capital letter is employed to describe a signal. For example, SN is the signal which, when it represents the binary digit "one," commands the bit pattern generator to send the next bit pattern toward the bit pattern register.

A number of elementary logic circuits are present in various ones of the figures. The symbols which are employed and the Boolean equations are shown in FIGS. 2a through 2f. For example, FIG. 2a illustrates a "nor" gate which is also sometimes known as a "none" gate. This gate may consist of an "and" gate which has an inverter in series with each of its input leads. Only two inputs are shown for convenience, though there may be more than two. Alternatively, it may consist of an "or" gate followed by an inverter. Regardless of the way in which the "nor" gate is implemented, its Boolean equation in the case in which there are inputs A and B and one output C is $\overline{AB}=C$ or $\overline{A+B}=C$. A "nor" gate is said to be enabled by having all its inputs "zero" and disabled by a "one" input. It is sometimes stated to be "primed" by any one "zero" input.

The convention adopted for a flip-flop is somewhat different than that usually employed. When the flip-flop is set, it produces a "one" output at its 0 output terminal and a "zero" output at its 1 output terminal. When the flip-flop is reset, it produces a "one" output at its 1 output terminal and a "zero" output at its 0 output terminal. This is shown in FIG. 2f.

An instruction consists of a number of binary bits which indicate a desired computer operation, how it is to be performed, the addresses in the memory of the data words on which the operation is to be performed, and so on. The instruction may initially be stored in a memory and, upon command, transmitted from the memory to an instruction register. In the present discussion only the portion of the instruction dealing with the "operation" to be performed is of interest.

Control circuits of prior art computers

Typical control circuits for computers are discussed in Chapters 17 and 18 of the volume, Digital Computer and Control Engineering by R. S. Ledley. The circuit of FIG. 1 is like one of those shown by Ledley. The purpose of discussing this circuit is to orient the reader with respect to the circuits shown in FIGS. 3–9 so that the reader may better understand where in a computer the present invention may be employed.

The instruction register 10 of FIG. 1 receives from the memory an instruction word. The portion of the word of interest here is known as the operation portion and, in general, is part of the instruction word. If the operation portion of the instruction word is made up of $n$ binary bits, the instruction register must include $n$ flip-flops, one for storing each binary bit.

The instruction decoder 12 is connected to the instruction register 10 by a bus 13. The bus 13 may include $n$ conductors, one for each binary bit or $2n$ conductors, $n$ conductors for carrying the binary bits of the word and $n$ conductors for carrying the complement of the word. In the latter case, each flip-flop has two outputs, one for the 0 output terminal and the other for the 1 output terminal.

The function of the instruction decoder is to produce a unique signal for the particular operation word stored in the register 10. If there are $2^n$ different operation codes which are possible, then the instruction decoder can produce any one of $2^n$ different output signals. The bus 15 at the output of the instruction decoder may contain $2n$ conductors, one for each of the signals the decoder is capable of producing.

The output of the instruction decoder is applied to an operations signal generator. This generator also receives timing pulses from a synchronous clock 16. This stage produces pulses of fixed duration which are spaced from one another by fixed time intervals. The operation signal generator produces one or more operations signals, sometimes also known as command signals or commands, for each operation code. These operations signals usually are applied directly to the stages which actually perform the operation directed by the operation code. For example, an operation signal may direct the words stored in addend and augend registers to be transferred to an adder. Other typical operations which may be commanded by the operations signals are subtraction, multiplication, shifting, clearing, transferring and so on.

System of the present invention

A schematic showing of the system of the present invention appears in FIG. 3. The showing is schematic in the sense that only the larger blocks of the system are shown. Later diagrams show details of some of the more important blocks.

The basic system is shown in dashed block 8a. It includes a memory 300, the output of which is applied to a data bus 302. An instruction register 10a connected to the data bus receives instruction words from the memory. The instruction words include operations portions and address portions. In the present invention, the operations portion of the word is of main concern. Hereafter, this is termed an "operations word."

The operations portion of the instruction register applies its output to an instruction bus 304. A partial instruction decoder 12a is connected to the bus 304. It decodes the operation words and produces signals which are applied to the machine instruction generator 18a. The machine instruction generator produces a sequence of signals know as "machine instructions" for each decoded operations word. Each machine instruction is converted by the following stage, bit pattern generator 20a, to a sequence of bit patterns. The bit patterns are applied, in sequence, to certain conductors of the bit pattern and control bus 306. This bus includes the conductors which connect to the BP bus 130, 132, 134 and the control bus mark, SN, 128, shown in FIGS. 7 and 8 and discussed later.

A bit pattern register 22 is connected to bus 306. It receives the patterns of bits in sequence. These are applied by the register 22, in sequence, to the bit pattern decoder 24. As is explained in more detail later, the decoder produces one or more command signals for each bit pattern. In the case in which there is only a basic system, the commands which are generated are applied only to networks 23 in the basic system which perform various operations in the basic system. Some of these are discussed in more detail later, however, for the present, a typical operation may be considered to be an arithmetic operation. The word or words on which the operation is performed come from the data bus 302. The resulting word may be applied via bus 308 and other circuits, which are not of interest here, to the memory of the data processing system or to data registers in the system.

When a circuit which receives a command completes its function, it produces an output signal, known here as a "return," which is applied to the circuits for sensing returns 27. The circuits 27, in turn, produce signals which are applied back to the bit pattern decoder and bit pattern register. These signals cause a pattern of bits stored in the register to be cleared from the register. Circuits associated with the bit pattern register, in turn, apply control signals via certain wires of bus 310 and certain wires of bus 306 back to the bit pattern generator and machine instruction generator. The bit pattern generator 20a thereupon applies a new pattern of bits to the bit pattern register 22 and the bit pattern decoder produces one or more new commands.

The system just discussed may be expanded by adding to the basic system 8a an added or supplemental system shown within block 8b. The added system includes its own partial instruction decoder 12b, its own machine instruction generator 18b and its own bit pattern generator 20b. The partial instruction decoder responds to certain operations words stored in the instruction register 10a. The corresponding sequence of patterns of bits are applied from the bit pattern generator 20b via certain wires of the bus 306 back to the bit pattern register 22 in the basic system. The bit pattern decoder 24 in the basic system produces a group of commands in response to the stored bit pattern. The gates which produce the commands in the bit pattern decoder may be gates which are originally provided in the decoder but not used in the basic system. Alternatively, they may be gates in the bit pattern decoder which are used in different combinations than were previously used. Alternatively, they may be combinations of old gates in a bit pattern decoder and some gates which are added to the bit pattern decoder when the first system is added. In the latter case, the modification required of the bit pattern decoder is minor.

The commands produced by the bit pattern decoder 24 may be applied via a bus 312 to stages to be controlled in the first added system. These are legended 23b in the figure. The bus 312 is available in the basic system but is not used in the basic system. Alternatively, the commands generated by the bit pattern decoder 24 in response to the signals received from the bit pattern generator 20b in the first added system may be applied to certain networks in block 23 of the basic system in order to execute a new operation utilizing the basic system, but controlled by a sequence of signals generated by control circuits 12b, 18b, 20b in the first added system. Alternatively, the signals from the generator 20b in the added system can be applied to certain networks in block 23 in the basic system in order to execute a basic (old) operation (which the basic system itself was capable of executing with its own complement of machine instruction signals), but in block 23b of the added system.

When the partial instruction decoder 12b in the first added system 8b is activated, it applies a signal via lead 313 to inhibit circuits 31b. The function of the circuits 31b is to inhibit the machine instruction generator 18a in the basic system. Actually, the signal on lead 314 inhibits generator 18a at all times except when the partial decoder 12a and no other decoder is activated. Accordingly, it is possible for only one machine instruction generator to operate in response to one operation code. It may be that the operation code in a particular case is the same for the instruction decoder 12a and the instruction decoder 12b. In this case, as will be shown in more detail shortly, both partial instruction decoders 12a and 12b are activated. However, the inhibit circuits inactivate the machine instruction generator 18a in the basic system. Thus, the operation called for by the first added system overrides the same operation which would otherwise have been performed by the basic system.

The expansion of the computer is not limited to one level of expansion. FIG. 3 shows that a second system can be added as well as a first system. It might be mentioned that third, fourth, and other systems could be added as well. The second added system includes a partial instruction decoder 12c, a machine instruction generator 18c, and a bit pattern generator 20c. The system may also include stages 23c for performing various operations. The bit pattern generated in the second added system is applied back to the bit pattern register 22 in the basic system. The commands generated in the basic system may be applied to stages 23 in the basic system, or they may be applied via bus 312 to the stages 23b in the first added system, or they may be applied via bus 316 to stages 23c in the second added system. It is also possible to apply certain of the commands corresponding to one sequence of machine instruction signals to one or more of stages 23, 23b and 23c, and other commands corresponding to sequence of machine instruction signals to other one or ones of stages 23, 23b and 23c. When partial instruction decoder 12c is activated, inhibit circuits 31c and 31b maintain machine instruction generators 18b and 18a inactive, respectively, via leads 318 and 314, respectively.

*Figure 4*

A more detailed showing of certain of the circuits of FIG. 3 appears in FIG. 4. In a practical computer of which the present invention is a part, the operations word has eight bits. However, for the sake of drawing simplicity, the operations word is considered to have only three bits and only three flip-flops 320, 322 and 324 are shown in the instruction register 10a. There are six output gates for the instruction register, namely 326, 328, 330, 332, 334 and 336. The various gates are connected to the 1 and 0 output terminals of the various flip-flops. The gates may be initially disabled by an $LM=1$ signal applied to the gates. When $LM$ changes to "zero," this primes all of the output gates.

In practice, the $LM=0$ signal may be derived from the last machine instruction signal of a sequence of such signals and, in this case, the $LM=0$ signal prevents the spurious repetition of the same sequence of machine instruction signals. However, for purposes of the present discussion, $LM=0$ may be considered to be a signal which commands the operations word stored in the instruction register to be applied to the bus 304, and which can be applied manually or, more practically, automatically in response to the transfer of an operations word from the memory register to the instruction register.

The instruction bus 304 is shown to have six wires. The wires $I_0$, $I_1$, and $I_2$ carry a three bit instruction word. The wires $\bar{I}_0$, $\bar{I}_1$ and $\bar{I}_2$ carry the complement of this word.

The instruction decoder 12a is shown to include four "and" gates, namely 342, 344, 346, and 348. "And" gate 342 is connected to the wires $\bar{I}_2$, $\bar{I}_1$, and $\bar{I}_0$. When these wires all carry a binary bit "one," "and" gate 342 is enabled. However, the binary bit "one" on these three wires corresponds to a reset condition of $2^0$, $2^1$ and $2^2$ flip-flop (flip-flops 324, 322 and 320), that is, storage of the binary bit "zero" by these three flip-flops. Accordingly, the "and" gate 342 can be said to respond to an operations code 000. It is for this reason that "000"

appears in "and" block 342. In a similar manner, the connections to the instruction decoder gates 344, 346 and 348 are such that they respond to the operation codes 001, 010 and 011, respectively.

The outputs of the four decoder gates are applied to the machine instruction generator 18a. There are also connections from the outputs of the four decoder gates 12a to "nor" gate 350. The latter, in turn, is connected to "nor" gate 352. The output of "nor" gate 352 is a trigger signal $TR_1$ which starts the machine instruction generator 18a.

The first added system 8b includes the instruction decoder 12b. For purposes of illustration, this decoder is shown as having two decoder gates, namely 354 and 356. (There may be many more than this number of gates.) The outputs of these gates are applied to the machine instruction generator 18b, "nor" gate 358 and "nor" gate 361. The output of "nor" gate 358 serves as an input to "nor" gate 360 which also receives $NO_2$ as an input signal. The output of "nor" gate 360 is a trigger signal $TR_2$ for machine instruction generator 18b.

The added system 8b includes a network for detecting the absence of an operation code on the instruction bus 304. The network includes three "nor" gates 362, 364 and 368. Each "nor" gate has two inputs, one of which is a bit of the word and the other of which is the complement of that bit. The output of the "nor" gates is applied through a delay line 370 to "nor" gate 361. The output of "nor" gate 361 is applied through inverter 562 to the "nor" gate 352. The signal $NO_1=1$ at the output of inverter 562 inhibits the machine instruction generator 18a. In other words, when $NO_1=1$, "nor" gate 352 is disabled and the trigger $TR_1$ is prevented from being generated. $NO_1$ can be made "zero" if and only if the output of delay means 370 is low, $NO_2$ is low and both "and" gates 354 and 356 do not conduct.

The second added system 8c includes an instruction decoder 12c shown as having two decoder gates 363 and 365. The outputs of these gates are applied to "nor" gates 369 and 371. "Nor" gate 369 is connected to "nor" gate 372 which also receives an $NO_3$ input signal. Gate 372 produces the trigger signal $TR_3$ for machine instruction generator 18c.

The circuit including "nor" gates 374, 376 and 378 as well as delay line 380 and "nor" gate 371 is for the purpose of triggering "nor" gate 371 when instruction decoder 12c has settled (when all bits are present in the decoder 12c). "Nor" gate 371 connected through inverter 382 to "nor" gates 360 and 361 in the first added system 8b. The $NO_2=1$ signal initially produced by inverter 382 inhibits the machine instruction generator 18b, by preventing "nor" gate 360 from generating a $TR_2=1$ signal. The corresponding $NO_1$ signal produced as a result of the $NO_2=1$ signal applied to "nor" gate 361 prevents the trigger signal $TR_1$ from being generated. However, if all bits are present, and if at the same time neither gate in decoder 12c is activated, and if $NO_3$ is also "zero," then all inputs to "nor" gate 371 are "zero," it conducts and $NO_2$ changes to "zero." This primes "nor" gates 360 and 361.

In the operation of the system of FIG. 4, assume first that there is only the basic system 8a. In this case, the lead 384 to "nor" gate 352 "floats" or may be eliminated. This may be construed to be equivalent to the binary bit "zero" on lead 384. Assume now that a signal $SEO=1$ is applied to the machine instruction generator 18a and a signal $LM=0$ is applied to output gates 339. Assume also that the code stored in the instruction register is 000.

When the signal $LM=0$ is applied, the output gates 339 are primed. Flip-flops 320 and 322 and 324 are all reset so that there is a "zero" present at each 0 output terminal. Accordingly, "nor" gates 328, 322 and 326 become enabled and the binary bit "one" appears on leads $\bar{I}_0$, $\bar{I}_1$ and $\bar{I}_2$ of the instruction bus 304. These bits enable "and" gate 342 which applies a "one" to "nor" gate 350. The output of "nor" gate 350 is therefore "zero." This "zero" serves as one input to "nor" gate 352 and since the other input (lead 384) is also "zero," a $TR_1=1$ signal appears at the output lead 386 of "nor" gate 352. This signal is a trigger signal for the machine instruction generator and the latter produces a sequence of machine instructions in a manner to be discussed in more detail shortly.

Assume now that the first and second systems are added to the basic system 8a. Assume also that the output gates 339 are all disabled and no information appears on the instruction bus 304. Under these conditions each of "nor" gates 362, 364 and 368 is enabled. As a matter of fact, if a bit is missing from only one pair of leads such as $\bar{I}_2$ and $I_2$ so that both appear to carry the binary bit "zero," then one "nor" gate such as 362 is enabled. When any one of "nor" gates 362, 364 and 368 is enabled, a "one" appears at lead 388. This "one" is delayed by delay line 370 and inactivates "nor" gate 361. The latter thereupon produces a binary bit "zero" and it is applied to inverter 562. The inverter produces an output signal $NO_1=1$ which is applied to lead 384. The output signal inactivates "nor" gate 352 preventing the generation of trigger signal $TR_1$.

Assume now that $SEO=1$ is applied to all machine instruction generators. The SEO signal "primes" the generators but they cannot operate until they receive, in addition, a signal from an instruction decoder gate. Assume that $LM=0$ and that the operation code 100 is on the instruction bus 304. This code enables decoder gate 354 and it applies a "one" to the machine instruction generator 18b, "nor" gate 358 and "nor" gate 361. A "one" applied to "nor" gate 361 maintains "nor" gate 361 disabled even though delay means 70 produces a "zero" output signal. "Nor" gate 361, therefore, retains its "zero" output which is inverted by inverter 562. The resulting signal $NO_1=1$ remains as an inhibiting signal to "nor" gate 352 thereby preventing the generation of the trigger signal $TR_1$. Accordingly, the machine instruction generator 18a remains disabled.

The "one" applied from "and" gate 354 to "nor" gate 358 causes the latter to produce a "zero" output. "Nor" gate 360 thereby becomes enabled and applies a $TR_2=1$ signal as a trigger to machine instruction generator 18b. Accordingly, the machine instruction generator 18b begins to operate and to generate a sequence of machine instructions.

One-third example assumes that the word on the instruction bus is 000. In this case, "and" gate 342 in the basic system and "and" gate 363 in the second added system 8c are both enabled. However, the "and" gate 363 which is enabled causes the signal $NO_2$ to remain "one" even though the output of delay means 380 changes to "zero" removing the inhibiting signal for "nor" gate 371. The signal $NO_2$ applied to "nor" gate 361 causes the signal $NO_1$ to remain "one." $NO_1=1$ inhibits "nor" gate 352 preventing trigger signal $TR_1$ from being generated. Accordingly, machine instruction generator 18a is disabled even though its decoder gate 342 is enabled. The enabled "and" gate 363 in the second added system $8_1$ causes a trigger signal $TR_3=1$ to be produced by "nor" gates 369 and 372 and to be applied to the machine instruction generator 18c. Accordingly, machine instruction generator 18c generates a sequence of machine instructions when SEO is made "one."

The machine instructions generated at 18c cause a sequence of patterns of bits to be produced by the generator 20c. These patterns of bits are applied by the bit pattern (BP) wires of bus 306 to the bit pattern register 22. The commands thereupon produced in stage 24 may be fed back to stages in the second added system. For example, they may be fed back to a high speed arithmetic unit in the second added system.

System of FIG. 5

Figure 6:
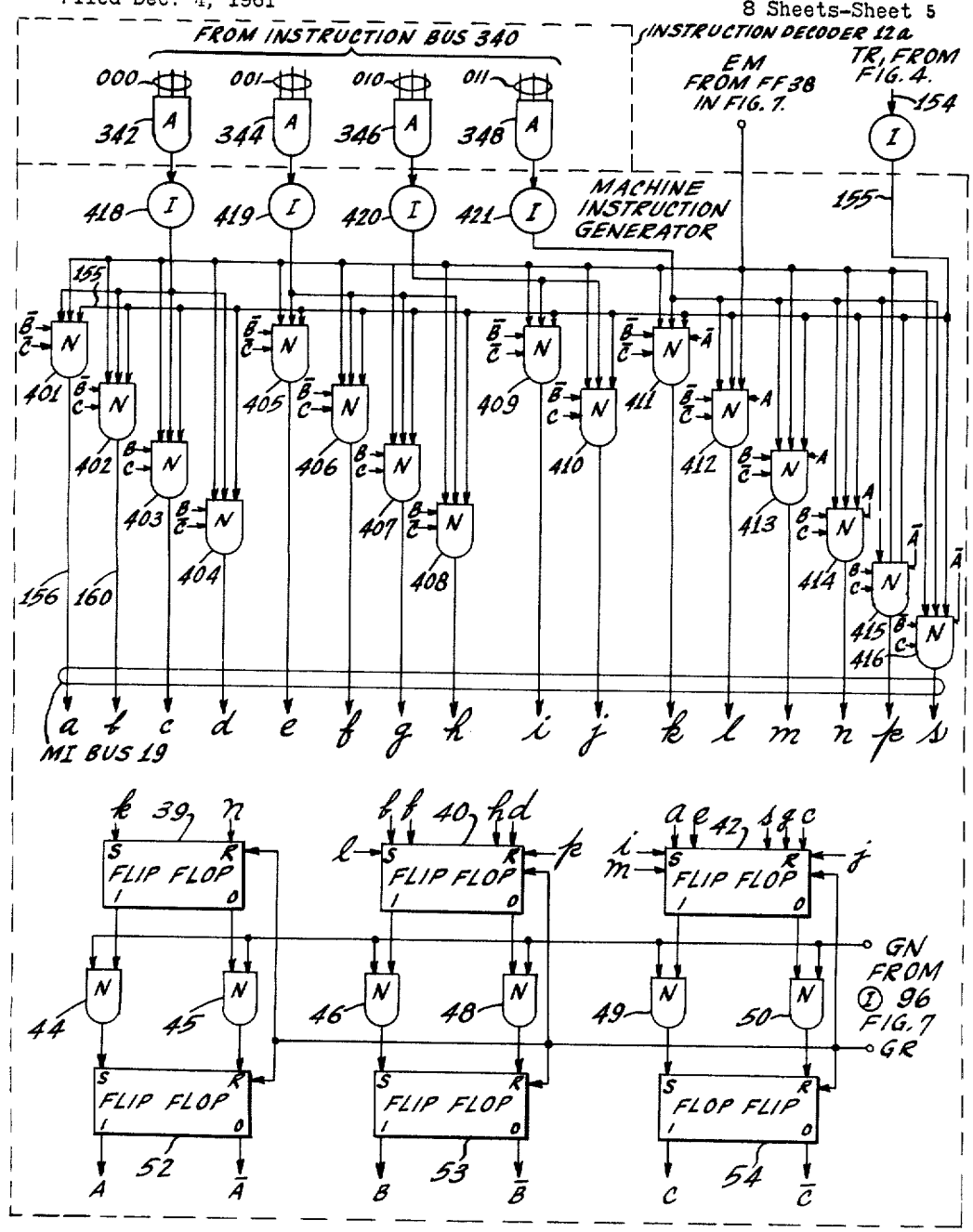
FIG. 6 is a more detailed drawing of a machine instruction generator and instruction decoder.

A more detailed block system diagram of the circuits from the instruction decoder through the command signal generator in, for example, the basic system 8a, appears in FIG. 5. The machine instruction generator and bit pattern generators in the added system are similar to those shown in FIG. 5 and in the detailed later figures and are, therefore, not illustrated separately. The instruction register 10a and instruction decoder 12a are analogous to stages 10 and 12 of FIG. 1. The instruction decoder is connected to a machine instruction generator 18a. It produces a sequence of machine instruction signals (MI's) for each operation code stored in the instruction register. The succeeding machine instruction signals are applied to a bit pattern generator 20a. In general, the generator 20a produces a different pattern of binary bits for each machine instruction it receives. It is possible for the same bit pattern to be generated more than once in response to two different machine instruction signals in one sequence of such signals, under certain conditions. This is illustrated in FIG. 6 and discussed thereafter. The bit pattern generated at the generator 20a is stored in a bit pattern register 22. The bit pattern register applies its output via bus 23 to a bit pattern decoder 24. This stage includes gates which are known as recognition gates. These gates produce the command signals analogous to the operations signals of FIG. 1.

Each machine instruction signal corresponds to one command signal or to several simultaneously occurring command signals. The command signal or signals may be applied to one circuit or to a group of circuits. For the purposes of illustration, the command signal corresponding to $MI_1$ is shown applied to a circuit 26; the command signal corresponding to machine instruction $MI_2$ is shown applied to a circuit 28; the command signal corresponding to machine instruction signal $MI_3$ is shown applied to circuit 30; the command signal corresponding to $MI_4$ is shown applied to a circuit 33. The circuits 26, 28, 30 and 33 also receive data words from bus 31. The circuits to which the command signals corresponding to $MI_5$, $MI_6$ and $MI_7$ (signals discussed later) are applied are not shown in FIG. 5, but are controlled in a manner similar to the circuits 26, 28, 30 and 33. Upon receipt of a command signal or signals by a stage such as 26, that stage performs the operation called for by the operation code and, when it has completed that operation, produces an output data word and a return $W_1$. The output data word is applied to some other circuit in the computer such as a register or the like.

The circuits 26, 28, 30 and 33 may be asynchronous circuits, synchronous circuits, or mixed synchronous and asynchronous circuits. A typical set of circuits to which one block such as 26 may correspond may include a synchronous switch, an asynchronous binary adder, a synchronous excess 3 converter, and a synchronous input switch to accumulators. These particular circuits are illustrated in FIG. 4 of application Serial No. 112,677, filed May 25, 1961, by L. L. Rakoczi and F. L. Wang and assigned to the assignee of the present invention. In this particular case, there are four simultaneously occurring command signals which are sent out on four different wires such as 22, 24, 26 and 28 of FIG. 1 of the above-identified application. The return signal $W_1$ which is generated when the entire operation is completed corresponds to the output R of delay means 73 shown in FIG. 4 of the application identified above.

Another example of circuits represented by a block such as 26 is a transmitting register and a receiving register. In this case, the command consists of a signal sent out on one wire for enabling the output gates of the transmitting register, a signal sent out on another wire for enabling the input gates of the receiving register, and a signal sent out on a third wire for enabling the output gates of the receiving register thereby permitting the receiving register to feed back the word it receives to a feedback bus. Circuits of this type are shown in application Serial No. 62,644, filed October 14, 1960, by L. L. Rakoczi and E. Gloates and assigned to the assignee of the present invention. The transmitting and receiving registers are shown in block diagram form in FIG. 1 of that application. This figure also shows a comparator circuit for generating a return W when the transmitted word has been received by the receiving register. The comparator compares the word on the feedback bus with the word on the bus leading to the receiving register.

The returns generated by the circuits 26, 28, 30 and 33 are applied to a circuit 32 which senses the returns and performs certain other operations as discussed in more detail later. The system of FIG. 5 also includes circuits 34 for sensing the transfer of a bit pattern to the bit pattern register for performing certain operations. Finally, the arrangement of FIG. 5 includes circuits 36 for sensing the presence of a bit pattern and for performing certain other operations in response to this presence. Actually, the circuits 34 and 36 are distributed throughout the other stages shown in FIG. 5 and certain circuits in blocks 36 and 34 are common to both blocks. The details of these circuits are shown in FIGS. 6, 7 and 8 and are discussed later.

In the operation of the system of FIG. 5, an instruction word in the memory is initially transferred via bus 37 to the instruction register. In the practical system under discussion, this transfer is effected by a sequence of machine instructions produced by another machine instruction generator (not shown). The steps in the transfer include reading the instruction word out of a memory location specified by an instruction control counter (not shown) and into the memory register (not shown), then transferring the word in the memory register to the instruction register 10a. However, for purposes of the present explanation, any other method of transferring an instruction word into the instruction register is also suitable.

The operation portion of the word is decoded by the instruction decoder and applied to the machine instruction generator. This code directs the machine instruction generator to produce a sequence of machine instruction signals. In response to this code and a pulse signal SEO (start execution of operation), the machine instruction generator 18 generates the first machine instruction signal $MI_1$.

In practice, the signal SEO comes from another machine instruction generator (not shown). The signal SEO is produced by the other machine instruction generator when the latter has completed a sequence of operations. This sequence of operations includes resetting the instruction register, advancing the instruction control counter (not shown) to produce a new memory address, storing this address in the memory address register, addressing the memory with the new address, extracting the word stored in the new memory address from the memory and placing it in the memory register, transferring the word from the memory register to the instruction register, and a number of other functions. Since these various functions are somewhat removed from the present invention, for the purposes of this discussion it may be considered that the signal SEO is simply a start pulse of sufficient duration to set flip-flop 38 (FIG. 7) which is applied to the machine instruction generator either by a start pulse generator or from the program area of the computer.

One further signal which will be discussed in more detail later is a signal GR. This is a general reset signal which is applied to the various stages shown in FIG. 5 when the data processing system is started. This signal resets many registers as is explained in more detail later. The general reset signal comes from the console (not shown) of the data processing system. It is applied after the "power-on" switch (not shown) has been turned on. The purpose of the GR signal is to set the computer to an initial starting state.

Returning now to the machine instruction generator 18a (FIG. 5), the first machine instruction signal $MI_1$ has been generated. This is applied via machine instruction bus 19 to the bit pattern generator 20a. The bit pattern generator produces a unique pattern of bits for each different machine instruction signal. The presence of this pattern of bits is sensed by the circuit 36. It applies a signal TB (transfer bit pattern) to the bit pattern register 22 whereupon the bit pattern is stored in the register. The circuit 36 also applies a signal DB to the bit pattern generator. Its function is to disable the output gates of the bit pattern generator. The circuit 36 also applies a signal DG to the machine instruction generator. The purpose of this signal is to disable the output gates of the machine instruction generator. The circuit 36 also applies a signal GN to the machine instruction generator. Its purpose is to start the generation of the next machine instruction signal, namely $MI_2$.

The circuit 34 senses the transfer of the bit pattern from the bit pattern generator to the bit pattern register. It first disables the input gates to the bit pattern register and then applies a signal IB to a circuit which essentially holds or latches the input gates of the bit pattern register 22 in a disabled condition. The circuit 34 also applies a signal EC to a circuit connected to the bit pattern decoder 24. This signal enables the decoder gates and permits the one corresponding to the bit pattern stored in the bit pattern register to transmit a command signal to the circuit which is to execute the command. In the present instance, the command signal is transmitted to the circuits represented by block 26.

To digress for a moment, it has been previously mentioned that a machine instruction signal can correspond to a single output signal from a decoder gate or to several output signals or even to a sequence of signals. Nevertheless, for the purposes of keeping the explanation simple, in the circuit shown in detail later, each decoder gate produces only a single command signal.

Returning now to the circuit of FIG. 5, after a bit pattern has been transferred to the bit pattern register 22, the input gates to the register have been inhibited and the decoder gates have been enabled (EC). To continue, the circuits 34 generate also a signal EG which is applied to the machine instruction generator 18a. Its purpose is to enable the output gates of the machine instruction generator to permit the second machine instruction signal, which has already been generated, to be applied to the bit pattern generator. Finally, the circuits 34 produce a signal SN. Its purpose is to enable the output gates of the bit pattern generator by resetting flip-flop 92 of FIG. 7 so that the bit pattern can be generated onto BP bus 25 and applied to the input gates to the bit pattern register. These input gates, it should be recalled, are presently disabled so that the bit pattern corresponding to $MI_2$ cannot pass through the generator and into the bit pattern register. Instead, the bit pattern waits on the BPG bus 25.

When the operation or series of operations called for by machine instruction $MI_1$ is completed, the circuits 26 (FIG. 5) generate return $W_1$. The circuit 32 senses the return $W_1$ and performs the following functions in the order named. It applies a signal TC to the decoder gates. This signal disables the decoder gates and terminates the transmission of the command to the circuits 26. The circuit 32 next generates a signal RR and applies it to the bit pattern register 22. Its purpose is to reset the bit pattern register. Finally, the circuit 32 generates a signal TB' and applies it to the bit pattern register 22. This signal essentially unlatches the input gates to the bit pattern register, these gates become enabled, and the bit pattern waiting on the bit pattern bus 25 is transmitted through the input gates to the bit pattern register.

The cycle discussed above is subsequently repeated as many times as there are machine instruction signals in a sequence of such signals. For example, as soon as the bit pattern corresponding to the second machine instruction signal is sensed and stored, the output gates of the machine instruction generator 18a are disabled, the machine instruction generator is commanded to begin the generation of the third machine instruction signal and so on. Each bit pattern which is generated queues up on the bit pattern bus 25 until a return is received which indicates that the command corresponding to the previous bit pattern has been executed. Thereafter, the bit pattern register 22 is reset, the new bit pattern is applied to the bit pattern register, the decoder gates are enabled and so on.

When all of the machine instructions in a given sequence have been "executed," a signal is generated which causes a new instruction word to be transferred from the memory to the instruction register 10a. Thereupon, the instruction decoder 12a produces a new output which may be applied to another machine instruction generator (not shown) or to the same machine instruction generator 18a for generating a different sequence of machine instruction pulses. In any case, the signal from the instruction decoder 12a to the machine instruction generator 18a changes so that the cycle of operation just discussed terminates.

It is mentioned above that the machine instruction generator 18a can be one of the type which is capable of producing more than one sequence of machine instruction signals. For example, one sequence may be $MI_1$, $MI_2$, $MI_3$, $MI_4$. A second sequence may be $MI_1$, $MI_5$, $MI_6$, $MI_2$. Still another sequence may be $MI_2$, $MI_3$ and so on. A machine instruction generator of this type is shown in FIG. 6.

*Detailed explanation of the system shown in FIGS. 6, 7 and 8*

A more detailed drawing of the arrangement of FIG. 5 appears in FIGS. 6, 7 and 8. FIG. 7 should be placed immediately above FIG. 8 as indicated in the legend on FIG. 8. FIG. 6 and the top of FIG. 7, which show the machine instruction generator of the basic system, are discussed first. The outputs of the circuit of FIG. 6 are applied as inputs to the bit pattern generator shown in FIG. 7.

The machine instruction generator 18a includes six flip-flops 39, 40, 42, 52, 53 and 54. "Nor" gates 44, 45, 46, 48, 49 and 50 receive the outputs of flip-flops 39, 40 and 42 and apply set and reset signals to the flip-flops 52, 53 and 54. The outputs of flip-flops 52, 53 and 54 serve as inputs to the sixteen "nor" gates 401–416, inclusive, divided into groups of gates.

There are four groups of "nor" gates, namely 401–404, 405–408, 409–410, 411–116. As can be seen in the drawing, each "nor" gate in a group of such gates receives a different combination of inputs. For example, in the group 401–404, each "nor" gate receives different combinations of B and C. Each group of "nor" gates is connected at its input to the output of a different one of the inverters 418–421 which, in turn, receives the output of a different one 342, 344, 346, 348 of the instruction decoder gates 12a. Thus, each group of "nor" gates responds to a different instruction code. Each group of "nor" gates generates a different sequence of machine instructions. The machine instructions are indicated by small letters *a* through *n*, *p* and *s*. The correspondence between the small letters, the machine instructions bearing subscripts, and various bit patterns is given in the chart of FIG. 10.

The various machine instructions are applied as set and reset signals to the flip-flops 39, 40 and 42 in the manner indicated in FIG. 6. For example, machine instruction *a* sets flip-flop 42; machine instruction *b* sets flip-flop 40 and so on.

The machine instructions are also applied as inputs to the "nor" gates 60, 64 and 68 of the bit pattern generator 20a shown in FIG. 7. For example, machine instruction signal a ($MI_1$) is applied to "nor" gate 68. Machine instruction signal b ($MI_2$) is applied to "nor" gate 64. Machine instruction signal c ($MI_3$) is applied to "nor" gates 64 and 68. The "nor" gates 60, 64 and 68 apply their outputs to "nor" gates 62, 66 and 70, respectively. The second input to the "nor" gates 62, 66 and 70 is the 0 output of flip-flop 92.

A part of the circuit 36 (FIG. 5) for sensing the presence of a bit pattern includes (see FIG. 7) "nor" gate 72, delay line 74 and "nor" gate 76. In the absence of a bit pattern, that is, when "nor" gates 62, 66 and 70 are disabled, "nor" gate 72 receives all zeros as inputs and produces a "one" output. This "one" output serves as an input to "nor" gate 76 so that the "Mark" signal output of "nor" gate 76 is a "zero." However, as soon as one or more of the "nor" gates 62, 66 and 70 produces a "one" output, "nor" gate 72 is enabled and, after the delay imparted by delay means 74, "nor" gate 76 receives a "zero" on one of its inputs 150. Flip-flop 92 is reset when one or more of the "nor" gates 62, 66, 70 is enabled so that the second input 152 to "nor" gate 76 is also "zero" and a mark signal appears indicating the presence of a full bit pattern on the BP bus 25. The purpose of the delay inserted by delay means 74 is to insure that all generated ones are on the BP bus before the mark signal is generated.

The bit pattern register 22 shown in FIG. 8 includes input "and" gates 78, 80 and 82 which receive as one input the outputs of "nor" gates 62, 66 and 70 (FIG. 4). The leads from "nor" gates 62, 66 and 70 are 130, 132 and 134. The register also includes gates, one of which 83 is shown, for receiving inputs from the bit pattern generators, such as 20b in FIGS. 3 and 4, in the added systems. The "and" gates 78, 80, 82 and 83 apply their outputs as set signals for flip-flops 104, 106, 108 and 109.

The circuits 34 (FIG. 5) for sensing the transfer of a bit pattern to the bit pattern register include "nor" gate 86, delay line 88 and "and" gate 84. The delay line 88 is bypassed by lead 89 and serves merely to "stretch" the output of "nor" gate 86. The circuits 34 also include inverter 116, delay 120, "nor" gate 118 and flip-flop 122. The operation of these circuits is discussed in greater detail later.

There may be a large number of decoder gates 24. Only eight of these gates 112, 113, 114, 115, 117, 119, 121 and 123 are illustrated in FIG. 8. Each receives a different combination of four inputs from the flip-flops of the bit pattern register 22. It should be appreciated that even the four flip-flops shown can produce outputs which are permuted in $2^4$ or sixteen different ways. Accordingly, these flip-flops can actuate at least sixteen different "nor" gates. Further, the decoder gates can, if desired, also include "or" gates for deriving many more than three commands from the eight gates shown. For example, "nor" gate 112 may apply its output to four different "or" gates so as to produce four command signals when it is enabled. In a similar manner, "nor" gate 114 may apply its output to two of the "or" gates which receive outputs from "nor" gate 112 and two, three, or more other "or" gates and so on. Again, these features are not directly involved in the present invention and accordingly are not illustrated or discussed further.

In a preferred form of the present invention, the decoder gates 24 are distributed, that is, they are positioned not in the central control area of the computer but close to the networks they control. Accordingly, the leads between the flip-flops of the bit pattern register and the decoder gates may be relatively long. This may introduce problems as discussed in application Serial No. 116,592, filed June 12, 1961, by W. J. Gesek and L. L. Rakoczi and assigned to the same assignee as the present invention. The Gesek and Rakoczi application discusses the use of an encoder between the bit pattern register and the decoder gates to solve such problems. As this encoder is not directly involved in the present invention, it is not shown here or discussed further.

The commands produced by the decoder gates are applied to the networks illustrated by the single block 390. When these have completed their operation, they produce return signals W. These return signals are applied to the circuits 32 in the basic system for sensing the return. These circuits include delay line 128, "or" gate 130, delay line 132 and flip-flop 124.

Some of the blocks in FIGS. 7 and 8 have not yet been mentioned, however, they will be discussed presently in connection with the discussion of the operation of the system which follows. It is assumed that the machine instruction generator and following stages in the basic system are operating.

In the operation of the system of FIGS. 6, 7 and 8, first a general reset signal GR is applied directly to flip-flops 38 (FIG. 7), 39, 40, 42, 52, 53, 54 (FIG. 6), 92 (FIG. 7), 122 and 124 (FIG. 8) to reset these flip-flops. The general reset signal GR is also applied through "or" gate 130 (bottom of FIG. 8) to reset flip-flops 104, 106, 108 and 109. The resetting of flip-flops 39, 40 and 42 (FIG. 6) primes one input to "nor" gates 45, 48 and 50. These gates remain disabled, however, as their second input GN is "one."

Next, the signal LM is made "zero" and the signal SEO (start execution of operation) is made "one." $LM=0$ primes the output gates 339 (FIG. 4) of the instruction register and an operation code is applied to the instruction bus 304. $SEO=1$ sets flip-flop 38 of the machine instruction generator (FIG. 7) changing EM to "zero." $EM=0$ is a priming signal for all of the "nor" gates 401–416 of the machine instruction generator (FIG. 6).

When an operation code is recognized by the decoder 12a (FIG. 6), the signal $TR_1$ on lead 154 upper right of FIG. 6 changes to "one." This signal, inverted by inverter 157, is a priming signal for all of the "nor" gates 401–416. Assume that the operation code is "000" so that instruction decoder gate 342 is enabled. Now the five inputs to "nor" gate 401 are all "zero." (The flip-flops 53 and 54 are reset so that $\overline{B}$ and $\overline{C}$ are both equal to "zero"; $TR_1$ is "one" so that input lead 155 is equal to "zero"; the 1 output of flip-flop 38 (EM) is also equal to "zero"; the output of inverter 418 is "zero.") When "nor" gate 401 is enabled, it produces the machine instruction signal $a=1$ ($MI_1=1$). This signal sets flip-flop 42 making "zero" one input to "nor" gate 49.

Skipping for a moment to "nor" gates 62, 66 and 70 (FIG. 7), prior to the appearance of any machine instruction signal on machine instruction bus 19 (the input leads to "nor" gates 60, 64 and 68), "nor" gates 62, 66 and 70 all receive "one" inputs from "nor" gates 60, 64 and 68, respectively. Accordingly, "nor" gates 62, 66 and 70 each produce a "zero" output. These three "zero" outputs are received by "nor" gate 72 so that it produces a "one" output which is applied through delay line 74 to input 150 of "nor" gate 76. Accordingly, the "nor" gate 76 is disabled and produces a "zero" output.

Returning now to the machine instruction bus 19, lead 156 carries a "one" and all other leads carry a "zero." The "one" is applied to "nor" gate 68 disabling this "nor" gate so that it produces a "zero" output. The "zero" output is applied to "nor" gates 70. This "nor" gate also receives a "zero" input from the 0 terminal of flip-flop 92 which is in the reset state. Accordingly, "nor" gate 70 becomes enabled and "nor" gates 62 and 66 remain disabled. Thus, the bit pattern $BP_1=001$ appears on the output leads 130, 132, 134 of the bit pattern generator. This pattern immediately disables "nor" gate 72.

To summarize the operation so far, the machine instruction generator has produced an $a=1$ ($MI_1=1$) output. This output has been applied to the bit pattern generator and a bit pattern appears on BP bus 130, 132, 134. Gate 72 senses the presence of the bit pattern and becomes disabled, a "zero" appearing at its output.

After the delay introduced by delay means 74, the "zero" output of "nor" gate 72 appears at input lead 150 to "nor" gate 76. Flip-flop 92 is reset so that input 152 to the "nor" gate 76 is also "zero." Accordingly, "nor" gate 76 produces a "one" output, the Mark signal, and "and" gate 84 (FIG. 8) receives this "one" output on its input lead 162. The second input to "and" gate 84 is the 1 output of flip-flop 124 which is reset. Accordingly, "and" gate 84 becomes enabled. The "one" output of "and" gate 84 is applied via leads 170, 172 and 174 as a "one" input ($TB=1$) to "and" gates 78, 80, 82 and 83, thereby priming these "and" gates. Therefore, the bit pattern corresponding to $MI_1$, that is, the bit pattern $BP_1=001$ passes through "and" gates 78, 80 and 82 to the flip-flops 104, 106 and 108. This pattern sets flip-flop 108 but flip-flops 104, 106 and 109 remain reset. Four of the five inputs to decoder gate 109 are now "zero," however, the fifth input Z is a "one." This fifth input is the 1 output of flip-flop 122.

Summarizing again for a moment, the bit pattern on leads 130, 132 and 134 has been applied through the input gates 78, 80 and 82 of the bit pattern register to the bit pattern flip-flops. These flip-flops store the bit pattern for the present.

The "one" output of "and" gate 84 is applied through leads 170, 172 and delay means 90 as a $DB=1$ set signal for flip-flop 92. This disables "nor" gate 76 since lead 152 now carries a "one." Accordingly, the output of "and" gate 84 becomes "zero." This "zero" output is applied via leads 170 and 176 to "nor" gate 118. The second input to "nor" gate 118 is the signal appearing on lead 178. This input initially is a "zero" since a "one" input was formerly present on lead 180. After a time determined by the delay imparted by delay means 120, a "one" appears at lead 178. However, for the interval of delay means 120, two zeros are present at the input to "nor" gate 118 and therefore this "nor" gate produces a "one" output ($EC=1$ and $IB=1$ pulses) for a time equal to the delay of delay line 120. The delay imparted by delay means 120 is sufficient to produce an output pulse of sufficient duration to set flip-flop 122. This output pulse EC (execute command) causes a "zero" to be applied to "nor" gate 112 in the bit pattern decoder 24 so that the five inputs to this "nor" gate are all "zero." Accordingly, "nor" gate 112 applies a "one" to the network in block 390 to which it is connected.

The "one" output of "nor" gate 118 is also applied as a set signal IB (inhibit transfer of bit pattern to register) to flip-flop 124. This produces a "zero" on output lead 182 of the flip-flop and this "zero" is applied back to "and" gate 84. Accordingly, this "and" gate is now "latched" to produce a "zero" output so that the input gates 78, 80, 82 and 83 of the bit pattern register 22 are disabled.

Returning now to the bit pattern generator 20a (FIG. 7), the "one" output of the delay means 90 has set flip-flop 92 disabling the gates 62, 66 and 70 of the bit pattern generator. This "one" output is also applied via leads 164 and 166 as a reset signal DG (disable gates) for the flip-flop 38. The reset flip-flop 38 disables the machine instruction generator "nor" gates 401–416.

The "one" output of delay means 90 is delayed by delay means 94 and inverted by inverter 96. The resulting $GN=0$ signal primes "nor" gates 44, 45, 46, 48, 49 and 50 (FIG. 6). Flip-flop 42 is set and flip-flops 39 and 40 are reset so that "nor" gates 45, 48 and 49 (FIG. 6) become enabled. The output of gate 49 sets flip-flop 54; flip-flops 52 and 53 remain reset. The outputs of the flip-flops are now $\overline{A}=0$, $\overline{B}=0$ and $C=0$.

The "zero" output of inverter 96 (FIG. 7 upper right) is applied through inverter 100 to input 190 of "nor" gate 102. The inverter 100 converts the "zero" to a "one" so that "nor" gate 102 remains disabled for the present.

"Nor" gate 86 (FIG. 8, upper center) receives three inputs from the leads 130, 132 and 134, respectively, and an input from lead 135. As the "nor" gates 62, 66 and 70 are now disabled by the output of set flip-flop 92, and as lead 135 from an added system also carries a "zero," these four inputs are "zero." The fifth input to "nor" gate 86 is the "zero" output (Mark=0) of "nor" gate 76. The sixth input to "nor" gate 86 is the "zero" output of "and" gate 84. Accordingly, all six inputs to "nor" gate 86 are "zero" and the "nor" gate produces a "one" output. This "one" output is stretched by delay means 88 and is applied as a signal SN (send next bit pattern to input gates of bit pattern register) which resets flip-flop 92. Thus, "nor" gates 62, 66 and 70 are again primed and ready to send the next bit pattern.

Concurrently with the above, the "zero" output of "and" gate 84 (FIG. 8) has been applied via leads 170, 172 and 128, delay means 90, lead 164, and delay means 94 to the inverter 96. This inverter produces a "one" at its output which is applied through inverter 100 to "nor" gate 102. Thus, a "zero" appears on input lead 190. A "zero" is also present at this time at input lead 192. Accordingly, "nor" gate 102 produces an output signal $EG=1$ (enable output gates of machine instruction generator) which sets flip-flop 38. The flip-flop thereupon applies a "zero" ($EM=0$) as a fifth input to "nor" gate 402 (FIG. 6).

Returning for a moment to the circuit 98, 100 and 102 (FIG. 8, top), the duration of the "one" output pulse produced by "nor" gate 102 is equal to the delay imparted by delay means 98. After this delay interval, a "one" appears at lead 192 cutting off "nor" gate 102.

When "nor" gate 402 is enabled, it produces $b=1$ ($MI_2=1$) output on lead 160. This second machine instruction signal disables "nor" gate 64 so that it produces a "zero" output. This "zero" output is applied as an input to "nor" gate 66 which, as previously mentioned, also receives a "zero" from the flip-flop 92. Accordingly, the bus 130, 132, 134 now carries the bit pattern $BP_2=010$. The input gates 78, 80, 82 and 83 to the bit pattern register are disabled so that the bit pattern is effectively waiting on the BP bus.

Summarizing, briefly, somewhat the things that have occurred, a first machine instruction signal has been generated. It has produced a first bit pattern. This first bit pattern has been stored in the bit pattern register and has actuated one of the decoder gates. The decoder gate has applied a command to a network in block 390 controlled by the first machine instruction signal. This network is proceeding to perform its function as, for example, addition. In the meantime, the input gates to the bit pattern register have been disabled, the next machine instruction signal $MI_2$ has been generated and a bit pattern corresponding to the second machine instruction signal $MI_2$ has been generated. This bit pattern $BP_2$ has been placed on the BP bus leading to the disabled input gates to the bit pattern register. It might also be mentioned that the presence of the second bit pattern has already been sensed by the circuit 36 (FIG. 5) and it is preparing to disable the output gates of the machine instruction generator and to generate the next machine instruction. There are sufficient delays in the system to insure that this does not occur before the bit pattern waiting to be transferred into the bit pattern register is so transferred, as is discussed shortly.

When the network in 390 has completed the operation it it performing, it produces a return W which is applied to the circuits 32 (FIG. 8). The first output of circuits 32 is TC (terminate transmission of command) which is applied to reset flip-flop 122. This flip-flop now applies a "one" output to the decoder gates 24 thereby disabling all these gates and terminating the command applied to the network in 390. The W signal is delayed by delay means 129 and applied through "or" gate 130 as a signal RR (reset register) to reset the flip-flops 104, 106, 108 and 109 of the bit pattern register. The bit pattern register is now in condition to receive the bit pattern waiting on leads 130, 132, 134 and 135.

The output of "or" gate 130 is further delayed by delay means 132 and the delayed signal TB' (transfer bit pattern to register) is applied as a reset signal to flip-flop 124. This flip-flop now produces a "one" output on lead 182 which is applied as an input to "unlatch" "and" gate 84. The second or Mark input to "and" gate 84 is also a "one" (flip-flop 92 is reset) and "nor" gate 72 produces a "zero" output in the presence of a bit pattern on leads 130, 132 and 134. The "one" output of "and" gate 84 is applied via leads 170, 174 as an enabling signal for "and" gates 78, 80, 82 and 83 so that these gates now apply the bit pattern which is waiting on leads 130, 132, 134, 135 to the bit pattern register.

The remainder of the operation should now be clear. Shortly after the bit pattern passes into the register, this is sensed by the circuit including delay meas 90 and flip-flop 92. The flip-flop 92 is set disabling the bit pattern generator output gates. A new machine instruction signal is then generated and applied to the input gates to the bit pattern generator and so on.

A table summarizing some of the operations discussed above appears in FIG. 10. These correspond to different operations performed by the data processing system. For example, the operations code 011 may command the generation of the five multiple of a word stored in a memory and the storage of the resultant five multiple in the memory. This may entail repeatedly adding the word stored in an addend register to the word stored in an augend register, placing the sum in an accumulator and transferring the sum from the accumulator back to the addend register. (These stages are not of direct interest here and therefore not illustrated.) This is repeated five times in response to the five $MI_4$ signals generated. The final result is then transferred to the memory and this transfer is commanded by the $MI_3$ signal.

The bit patterns shown at the lower left of FIG. 4 and in the table of FIG. 10 each have three binary bits. However, the bit pattern register has four flip-flops and its output consists of four binary bits. The fourth bit is the one received on lead 135 of the bit pattern bus. As there are four flip-flops in the register, one may consider the bit patterns to consist of four bits rather than the three illustrated, with the fourth one always "zero" in the case of machine instruction signal generated in the basic system. This fourth bit is not illustrated in FIGS. 7 and 10.

In the data processing system under discussion, after a sequence of machine instructions has been generated, a signal is applied to the other machine instruction generator discussed, briefly, previously. This other machine instruction generator resets the instruction register and, in a series of steps, obtains a new instruction from the memory and applies it to the instruction register. In the process, the signals SEO and $TR_1$ become "zero" inactivating the machine instruction generator shown in FIG. 6. Thereafter, SEO becomes "one," LM becomes "zero," the instruction decoder decodes the operation portion of the instruction word stored in the instruction register and the circuits shown in FIG. 4 apply a trigger signal to one of the machine instruction generators in the system.

The circuit of FIG. 9 (which appears on the same sheet as FIG. 10, upper left) is a simplified showing of one way in which the sequence of machine instructions is terminated and the machine instruction generator reset. The "nor" gate which produces the last machine instruction signal is shown at 59. Gate 59 may represent a gate such as 404 which produces the last machine instruction signal $MI_4$ of a sequence of such signals. This signal is applied through inverters 200 and 202 to "nor" gate 204. The delay line 206 is connected from the output of inverter 200 to the second input to "nor" gate 204.

In operation, if the last machine instruction signal of a sequence is not present, lead 208 carries a "zero" and lead 209 carries a "one." This "one" is applied through delay means 206 to the "nor" gate 204. Accordingly, "nor" gate 204 is disabled.

When the last MI signal of a sequence is present, lead 208 carries a "one." This "one" is inverted by stage 200 and inverted again by stage 202 so that a "one" is applied to input 210 to the "nor" gate. A "zero" is present at lead 209. This "zero" is applied through delay means 206 to input lead 211 to the "nor" gate 204. The "nor" gate 204 is still disabled.

When the last MI signal of a sequence terminates, lead 208 changes from "one" to "zero." This "zero" appears at lead 210. Lead 211 already is carrying a "zero" so that "nor" gate 204 becomes enabled and produces an output $TMS=1$. This output pulse has a duration equal to the delay inserted by delay means 206. After this delay, the "one" present at lead 209 is applied to lead 211 and "nor" gate 204 becomes disabled.

The signal TMS (terminate machine instruction signal sequence) may be applied as a stop and reset signal to the machine instruction generator. This signal, for example, may be applied as a reset signal for flip-flops 39, 40, 42, 52, 53, 54 (FIG. 6). It may also be applied as a disabling signal to "nor" gate 102 (FIG. 7). Flip-flop 38 is already reset by the $DG=1$ signal from leads 164, 166. Finally, TMS may be applied to the other machine instruction generator (not shown) which applies a reset signal to the instruction register. Upon receipt of this reset signal, the signal $TR_1$ derived from the instruction decoder 12a changes from "one" to "zero" disabling the gates 401–416 of the machine instruction generator 18. All stages in the machine instruction generator 18 are now in condition to start a new cycle of operation. The new cycle begins when SEO becomes "one" and $TR_1$ becomes "zero."

The circuit of FIG. 9 makes it possible to use odd or even sequences of machine instruction signals without regard to the conditions of flip-flops 39, 40 and 42 at the time a sequence of such signals is terminated. However, the sequences of machine instruction signals can be so chosen that the last one resets all of the flip-flops 39, 40 and 42, not already reset by previous machine instruction signals. In this case, the signal GN derived from the last machine instruction signal of the sequence resets flip-flops 52, 53 and 54, so that all flip-flops of the machine instruction generator are reset. With the machine instruction signals so chosen, the circuit of FIG. 9 is not needed.

The machine instruction generator 18b and bit pattern generator 20b in the first added system (FIGS. 3 and 4) are analogous in structure and function to the machine instruction generator 18a and bit pattern generator 20a discussed in detail in connection with FIGS. 6 and 7. However, since the gates in the machine instruction generator are adapted to receive different codes in the added system than they are in the basic system, there will be different permutations of inputs from the instruction decoder gates 12b to the input gates of the machine instruction generator 18b. The bit patterns generated in a bit pattern generator in an added unit, such as the bit pattern generator 20b, are applied over a bit pattern bus to the bit pattern register 22 in the basic system. The number of wires in the bit pattern bus depend upon the number of codes which are generated at 20b. For the purpose of illustration, four wires 130', 132', 134', and 135 of such a bus are shown at the upper left in FIG. 8. These connect to the input gates 78, 80, 82, 83 of the bit pattern register in the manner shown.

There is also a control bus between the added system and the basic system. The control bus includes the wires 162', 127', and 128' shown at the upper right of FIG. 8.

Wire 162' comes from a gate in the bit pattern generator 20*b* analogous to the "nor" gate 76 of FIG. 7. This is the lead that carries the Mark signal from the bit pattern generator in an added system to the bit pattern register circuits in the basic system. The lead 127' carries the signal SN generated in the bit pattern register circuits of the basic system to a flip-flop analogous to flip-flop 92 located in the bit pattern generator of the added system. The lead 128' carries the output signal of "and" gate 84 (upper right of FIG. 8) in the basic system to a delay line analogous to delay line 90 (lower right of FIG. 7) in the bit pattern generator of the added system. Another part 392 of the control bus is shown at the lower left of FIG. 8. It carries a return W' (corresponding to W) from stages which perform various operations in the added system back to the circuit 32 in the basic system. The bus 392 is also shown in FIG. 3.

The feedback buses extending from the bit pattern and control bus 306 are shown schematically at 307 and 309 in FIG. 4.

The machine instruction generator and bit pattern generator of the second added system are analogous to corresponding units in the first added system and operate in a similar manner.

The various delays in the system have been mentioned in passing. The discussion below is to point out in somewhat greater detail the reasons for the various delays and the values, in a qualitative way, of the different delays.

The delay introduced by networks 72, 74, 76 is for the purpose of compensating for the difference in transmission times through, for example, gates 60, 62 and gates 64, 66. Thus, when a Mark=1 signal appears, it is certain that all bits making up a given pattern are present on the bit pattern leads 130, 132 and 134 before the input gates 78, 80 and 82 are enabled.

The delay introduced by delay means 90 (FIG. 7) is made sufficiently long to insure that the outputs of "and" gates 78, 80, 82 and 83 have sufficient time to set the flip-flops of the bit pattern register. The longer that lead 128 is, the shorter the delay introduced by delay means 90 needs to be.

The network 116, 118, 120 (FIG. 8) is essentially a pulse generator. It produces an output pulse when the signal on input lead 172 changes from "one" to "zero." The duration of the output pulse is equal to the delay introduced by delay means 120 (assuming that the length of time a "zero" appears on lead 172 is longer than the delay of 120). Accordingly, delay means 120 is made sufficiently long so that the output pulse can set the flip-flops 122 and 124.

The network 98, 100, 102 (FIG. 7) is also a pulse generator. However, the configuration of this generator is such that a change in the input appearing on lead 97 from "zero" to "one" produces an output pulse. Again, the delay means 98 introduces a delay sufficient so that the output pulse can set the flip-flop 38.

What is claimed is:

1. A digital data processing system comprising a basic system having an instruction register; a partial instruction decoder in said basic system connected to the register; at least one supplemental digital data processing system; a partial instruction decoder in said supplemental system connected to the register in said basic system; means in one of said systems executing a data processing operation controlled by the partial instruction decoder in said supplemental system; and means in said basic system for executing a data processing operation controlled by the partial instruction decoder in one of said systems.

2. A digital data processing system comprising, in combination, a basic system; an instruction register in the basic system; an instruction decoder in the basic system responsive to operations words stored in the register; means in the basic system responsive to a decoded operations word for generating command signals; a supplemental system; an instruction decoder in the supplemental system responsive to operations words stored in the instruction register in the basic system; and means responsive to an operations word decoded by the instruction decoder in the supplemental system for transferring control of the means in the basic system for generating command signals to the instruction decoder in the supplemental system.

3. A digital data processing system comprising, in combination, a basic data processing system; an instruction register in the basic system; an instruction decoder in the basic system responsive to operations words stored in the register; a supplemental data processing system; an instruction decoder in the supplemental system responsive to operations words stored in the instruction register in the basic system; means responsive to an operations word decoded by the instruction decoder in the supplemental system for transferring control of data processing system operations to the instruction decoder in the supplemental system; and means responsive to the absence of a bit in an operations word transmitted to one of said decoders for inactivating both of said decoders.

4. A digital data processing system comprising, in combination, a basic data processing system; an instruction register in the basic system; an instruction decoder in the basic system responsive to a number less than all of the operations words which can be stored in the register; means coupled to the instruction decoder for generating command signals which control data processing operations; a supplemental data processing system; and an instruction decoder in the supplemental system responsive to some of the operations words which can be stored in the instruction register in the basic system and coupled to the means in the basic system for generating command signals for controlling the generation of said command signals.

5. A digital data processing system comprising, in combination, a basic data processing system; an instruction register in the basic system; an instruction decoder in the basic system responsive to a number less than all of the operations words which can be stored in the register; a machine instruction generator in the basic system responsive to a decoded operations word for generating machine instruction signals; means in the basic system coupled to the machine instruction generator for generating command signals which control data processing operations; a supplemental data processing system; an instruction decoder in the supplemental system responsive to some of the operations words which can be stored in the instruction register in the basic system; a machine instruction generator in the supplemental system responsive to an operations word decoded by the instruction decoder in the supplemental system for generating machine instruction signals and coupled to the means in the basic system for generating command signals; and means responsive to the decoding of a word by the instruction decoder in the supplemental system for inactivating the machine instruction generator in the basic system.

6. In a digital data processing system, an instruction register which is capable of storing a greater number of operations words than the system normally uses; an instruction bus including terminals for connection to a partial instruction decoder in a supplemental data processing system which may be added to the basic system when expansion thereof is desired; a partial instruction decoder in the basic system connected to said bus and responsive to a number less than all of the operations words which can be stored in the instruction register; a system in the basic system responsive to decoded operations words for generating command signals for controlling data processing operations; and a bus connected to the system for generating command signals and including terminals for connection to a supplemental data processing system for permitting the latter to control the generation of command signals in the basic system in response to operations words decoded in the supplemental system.

7. A digital data processing system comprising, in combination, an instruction register; an instruction bus coupled to the register; an instruction decoder coupled to the bus for decoding words stored in the register; a machine instruction generator coupled to the decoder for generating a sequence of machine instruction signals in response to each word decoded by the decoder; a bit pattern generator coupled to the machine instruction generator for producing a pattern of binary signals in response to each machine instruction signal; a bit pattern bus to which said patterns of binary signals are applied; a register connected to the bit pattern bus for receiving and storing the successive patterns of bits; means coupled to the last-named register and responsive to the different patterns stored therein for generating command signals which control data processing operations; terminals on the instruction bus to which an instruction decoder in a supplemental data processing system may be connected; and terminals connected to the bit pattern bus to which a bit pattern generator in a supplemental system may be connected.

8. A digital data processing system comprising, in combination, an instruction register; an instruction bus coupled to the register; an instruction decoder coupled to the bus for decoding words stored in the register; a machine instruction generator coupled to the decoder for generating a sequence of machine instruction signals in response to each word decoded by the decoder; a bit pattern generator coupled to the machine instruction generator for producing a pattern of binary signals in response to each machine instruction signal; a bit pattern bus to which said patterns of binary signals are applied; a register connected to the bit pattern bus for receiving and storing the successive patterns of bits; means coupled to the last-named register and responsive to the different patterns stored therein for generating command signals which control data processing operations; a second instruction decoder in a supplemental data processing system connected to the instruction bus; a second machine instruction generator in said supplemental system coupled to said second decoder for generating a sequence of machine instruction signals in response to each word decoded by said second decoder; and a bit pattern generator in said supplemental system responsive to said second machine instruction generator and coupled at its output to said bit pattern bus.

9. A digital data processing system comprising, in combination, an instruction register; an instruction bus coupled to the register; an instruction decoder coupled to the bus for decoding words stored in the register; a machine instruction generator coupled to the decoder for generating a sequence of machine instruction signals in response to each word decoded by the decoder; a bit pattern generator coupled to the machine instruction generator for producing a pattern of binary signals in response to each machine instruction signal; a bit pattern bus to which said patterns of binary signals are applied; a register connected to the bit pattern bus for receiving and storing the successive patterns of bits; means coupled to the last-named register and responsive to the different patterns stored therein for generating command signals which control data processing operations; a second instruction decoder in a supplemental data processing system connected to the instruction bus; a second machine instruction generator in said supplemental system coupled to said second decoder for generating a sequence of machine instruction signals in response to each word decoded by said second decoder; a bit pattern generator in said supplemental system responsive to said second machine instruction generator and coupled at its output to said bit pattern bus; and an inhibit circuit responsive to a word decoded by said second decoder for inhibiting the machine instruction generator in said basic system.

10. An expandable data processing system comprising, in combination, an instruction register in a basic data processing system for storing operations words; control circuits in the basic system responsive to decoded operations words stored in the register for generating command signals which control the system's operations; a supplemental data processing system which is capable of performing certain operations; means in the supplemental system responsive to a decoded operations word stored in said register for assuming control of the generation of said command signals in said basic system; and means for applying the command signals generated in the basic system under the control of the means in the supplemental system to the supplemental system for controlling the latter's operations.

11. In a data processing system, an instruction decoder; a machine instruction generator coupled to the decoder for generating a sequence of machine instruction signals in response to a particular output from the decoder; a bit pattern generator coupled to the machine instruction generator for generating a pattern of parallel binary bits in response to each machine instruction signal; a register coupled to the bit pattern generator for storing the patterns of bits produced by the latter; and decoder gates coupled to the bit pattern register for receiving different combinations of outputs from the register, for producing command signals.

12. In combination, an instruction decoder; control circuits coupled to the decoder for producing signals in sequence for controlling a sequence of computer operations called for by a given instruction decoder output; and circuits to which said signals are applied for producing return signals which are applied back to said control circuits upon completion of individual ones of said operations for controlling the duration and time of occurrence of said signals which control said operations.

13. In combination, an instruction decoder; control circuits coupled to the decoder for producing signals in sequence for controlling a sequence of computer operations called for by a given instruction decoder output; and operation performing circuits to which said signals are applied for producing return signals which are applied back to said control circuits in response to completion of individual ones of said operations for controlling the duration and time of occurrence of said signals which control said operations.

References Cited by the Examiner
UNITED STATES PATENTS

| 2,914,248 | 11/1959 | Ross | 235—157 |
| 3,018,959 | 1/1962 | Thomas | 340—172.5 |

ROBERT C. BAILEY, *Primary Examiner.*

MALCOLM A. MORRISON, *Examiner.*

W. M. BECKER, *Assistant Examiner.*